United States Patent [19]

Novak

[11] Patent Number: 5,176,585
[45] Date of Patent: Jan. 5, 1993

[54] CHAIN LINK

[75] Inventor: Gary J. Novak, Indian Head Park, Ill.

[73] Assignee: Borg-Warner Automotive Transmission & Engine Components Corporation, Sterling Heights

[21] Appl. No.: 805,459

[22] Filed: Dec. 10, 1991

[51] Int. Cl.⁵ .................... F16H 7/08; F16G 13/04
[52] U.S. Cl. .................. 474/206; 474/111; 474/140
[58] Field of Search ............ 474/206, 212–217, 474/111, 140

[56] References Cited

U.S. PATENT DOCUMENTS

| | | | |
|---|---|---|---|
| 4,764,158 | 8/1988 | Honda et al. | 474/212 |
| 4,854,925 | 8/1989 | Chandrupatla | 474/212 |
| 5,055,088 | 10/1991 | Cradduck et al. | 474/140 X |
| 5,088,966 | 2/1992 | Suzuki et al. | 474/111 |

Primary Examiner—Thuy M. Bui
Attorney, Agent, or Firm—Willian Brinks Olds et al.

[57] ABSTRACT

A chain link is provided with a concave back configuration that substantially matches the curvature of the contact surface of a chain tensioner. In the chain assembly, as the backs of the links contact the chain tensioner surface, the contact stresses are reduced as a result of the matched curvatures. The link geometry is utilized in both silent chain and roller chain assemblies.

12 Claims, 3 Drawing Sheets

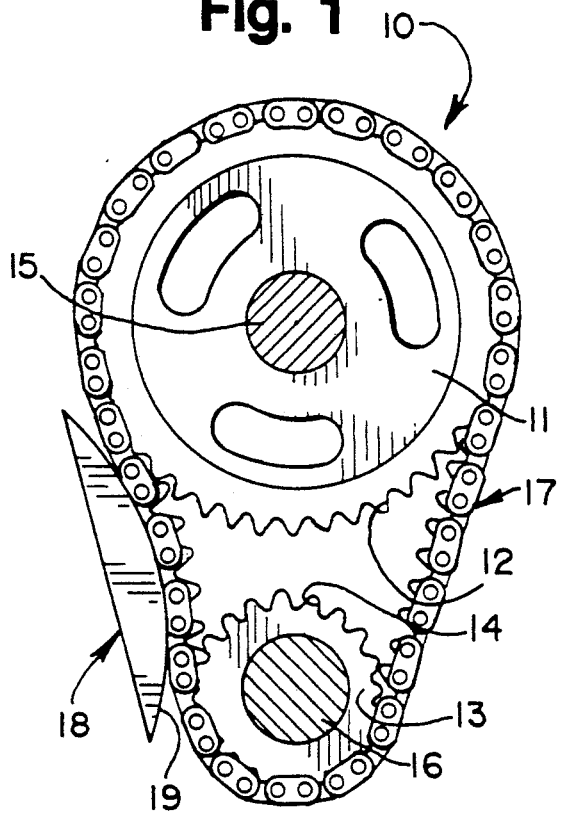
Fig. 1
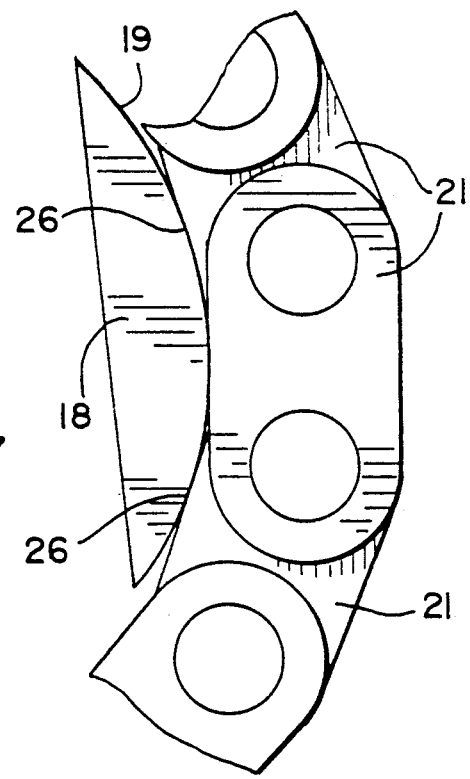
Fig. 2
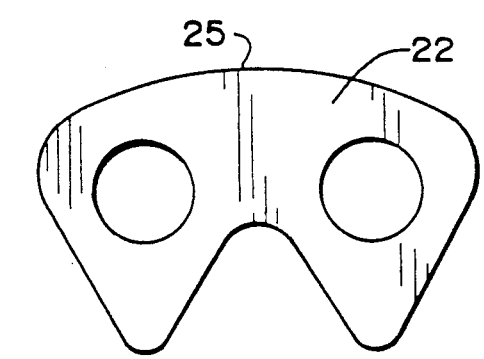
Fig. 3 Prior Art
Fig. 4 Prior Art
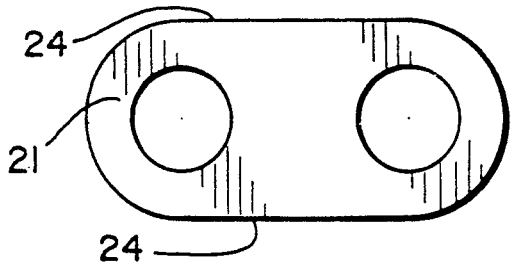
Fig. 5 Prior Art
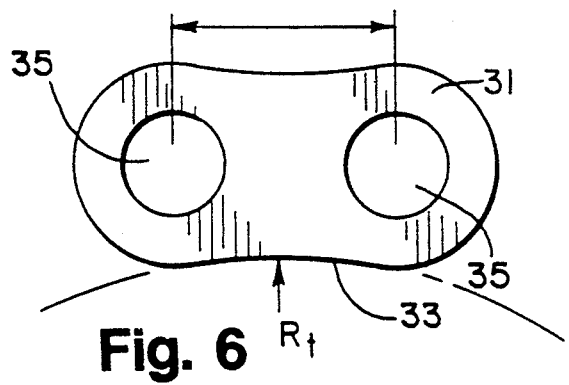
Fig. 6

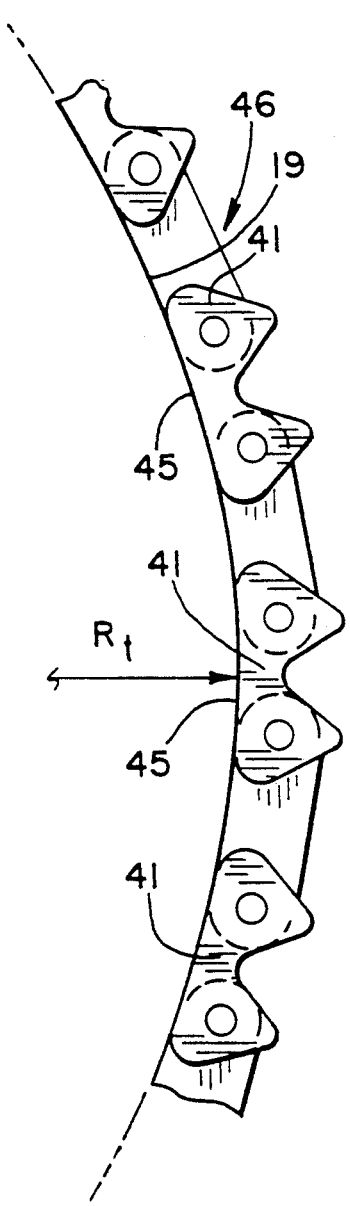
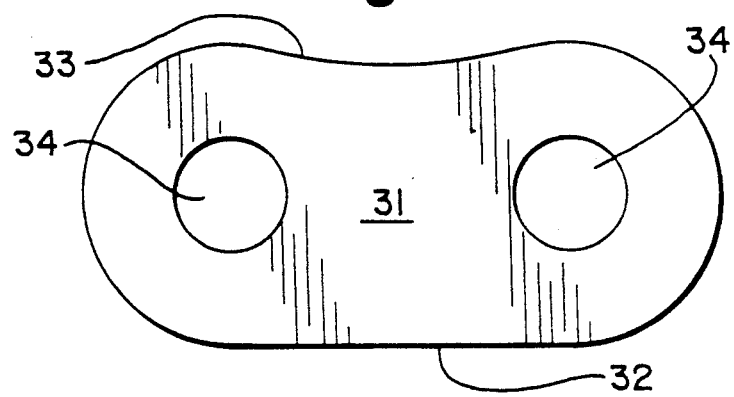
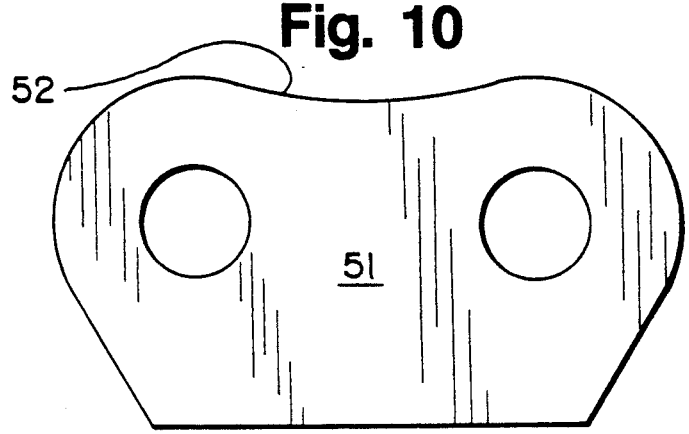
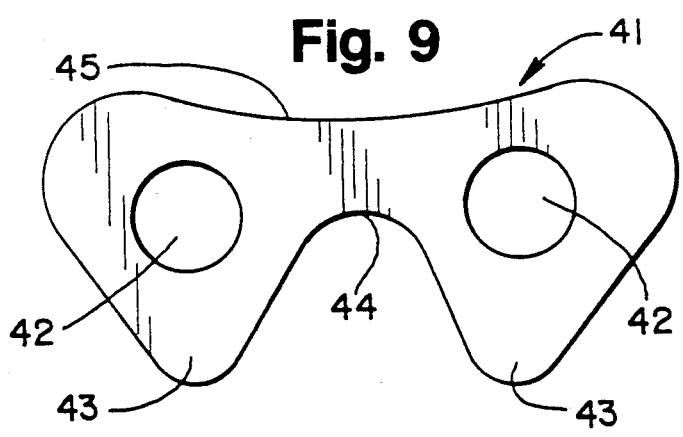
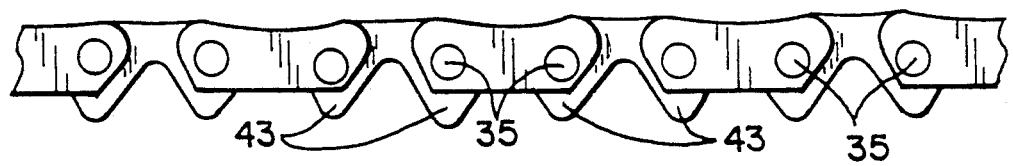

CHAIN LINK

BACKGROUND OF THE INVENTION

1. Field of the Invention

The present invention relates generally to power transmission chains and link geometries for such chains. The invention has particular application to power transmission chains of the roller chain and silent chain variety for use in engine timing systems applications. The invention has specific application to such chain links that are utilized in an assembly with a chain tensioning system.

2. Description of the Prior Art

Power transmission chains are widely used in the automotive industry. Such chains are used for engine timing drives as well as for the transfer of power from the torque converter to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference.

Conventional silent chains typically include both guide links and driving links. The guide links are positioned on the outside edges of alternate sets of links. The guide links typically act to position the chain laterally on the sprocket. Guide links do not act in the transfer of power between the chain and the sprocket.

The inverted tooth links, or inside or driving links, provide the transfer of power. Each link typically includes a pair of apertures and a pair of depending toes or teeth. Each toe is defined by an inside flank and an outside flank. The inside flanks are joined in a crotch. The links contact the sprocket teeth along the inside flanks or outside flanks or combinations of the two. The contacts between the flanks and the sprocket teeth can be of the type which provide a power transfer.

The backs or upper edge of the links, which are not typically involved in the transmission of power, are generally straight or convexly (outwardly) curved. In a chain of the hybrid type, that is, a type having more than one or configuration or type of link, the links may be identified by the shape of the backs of the links. U.S. Pat. Nos. 4,509,323 and 4,509,937 are examples of such link back shapes being used for link identification.

A second type of chain is known as "roller chain". A typical roller chain consists of alternate inner links and outer links. The inner links, which are also known as "bushing" links, consist of spaced sidebars with bushings tightly received in openings, or apertures, at each end of the sidebars. The outer links, which are also know as "pin" links, consist of spaced sidebars with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. An example of roller chain is found in U.S. Pat. No. 4,186,617, which is incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

A conventional chain drive is comprised of an endless silent or roller chain wrapped about at least two sprockets supported by shafts. Movement of a driving sprocket causes power transmission through the chain and consequent movement of a driven sprocket. In an engine timing drive application, the driving sprocket may be mounted on the engine crankshaft and the driven sprocket mounted on a valve camshaft. The rotation of the camshaft is thus controlled by the rotation of the crankshaft through the chain.

Many timing chain applications typically include a resiliently-biased chain tensioner positioned externally of the chain between the spaced sprockets. The tensioner acts to control chain tension during operation by providing a load against the back surfaces of the links of the chain assembly. A contact surface area is typically provided along the tensioner for contacting the chain. The tensioner can be placed on either the tight side or the slack side of the chain but is typically placed on the slack side.

The chain links in an assembly for use with a tensioner typically have flat or convex back surfaces. In a silent chain, the back of the link is the upper portion of the link. In a roller chain, the back of the link is the elongated portion of the side bars that extends between the apertures. As a consequence of the flat back surfaces, the links will have high contact stresses over a limited contact area between the tensioner contact surface area and the back of the chain link. Such contact stresses provide frictional losses which reduce the efficiency of the chain drive system.

More recent silent chain assembly designs, such as those shown in U.S. Pat. No. 4,758,210, which is incorporated by reference, have a reduced number of links in each row in order to decrease the width of the chain. This increases the loading on each link in the chain assembly. Moreover, the requirements for increasing engine speeds and, consequently, increasing chain drive speeds, have increased the localized frictional contacts between the chain links and the tensioner, and provided even greater inefficiencies.

The present invention acts to reduce the above-mentioned frictional contacts between the chain tensioner and the chain link through an improved chain link design.

SUMMARY OF THE INVENTION

The present invention relates to a novel chain link design which cooperates with an external chain tensioner to reduce the high contact stress between the chain tensioner contact surface and the back of the chain links. The novel link design provides a link with a back having a concave configuration. The concave back configuration generally conforms to the contact surface of the chain tensioner by having a radius of curvature that conforms to the tensioner geometry. The link design may be used in both roller chain links and in silent chain links.

The concave back surface acts to expand the previously limited contact area between the tensioner and each chain link resulting in a reduction in contact pressures and surface shear stresses and thus lower the unit loading. Such a concave configuration will also decrease the rate of wear of the tensioner contact surface and reduce the tendency for pitting and spalling of the tensioner surface.

In one embodiment of the present invention, a roller chain assembly for use with a sprocket includes a series of interleaved inner links and outer links. Each outer link has a pair of outer link plates fixedly mounted to spaced pin members as well as a front portion and a back portion. The back portion is defined externally of the interleaved chain assembly. Each inner link has a pair of bushings mounted to turn on the pins of the outer links. The inner links have the inner link plates fixedly mounted to the bushings. Each inner link plate has a front portion and a back portion, with the back portion being defined externally of the interleaved chain assembly. Each bushing is adapted to contact the teeth of a sprocket, with each of the inner links and the outer links being adapted to receive a sprocket tooth.

In this embodiment of the present invention, some or all of the outer link plates have a concave back portion which matches the concave configuration of the associated tensioner. Alternatively, some or all of the inner link plates have a concave back portion that matches the concave configuration of the associated tensioner.

In another embodiment of this invention, a silent chain is assembled with a plurality of interleaved sets of links. Pivot means, in the form of round pins, or pins and rocker joints, connect adjacent sets of links. Each link defines a pair of apertures for receiving the pivot means. The links of the chain have an upper portion and a lower portion. In the inner links, or driving links, each lower portion has a pair of toes separated by a crotch with each lower toe being defined by an outside flank and an inside flank.

In this embodiment of the invention, some or all of the upper portions of the links have a concave edge that matches the concave configuration of the associated tensioner. Alternatively, some or all of the guide links of the chain have a upper portion with a concave edge that matches the concave configuration of the associated tensioner.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 1 is an elevational view of a timing chain of the silent chain variety, having a pair of spaced sprockets and an external tensioner, with the chain links having the geometry of the present invention;

FIG. 2 is a side elevational view of a portion of conventional roller chain illustrating the contact with the chain tensioner;

FIG. 3 is an elevational view of a conventional silent chain link with a convex back or edge;

FIG. 4 is an elevational view of a conventional guide link for a silent chain with a straight link back;

FIG. 5 is an elevational view of a conventional roller chain link with a flat or straight edge;

FIG. 6 is an elevational view of a roller chain link having the concave back of the present invention, illustrating the radius of curvature of the concave back;

FIG. 7 is a partial elevational view of a silent chain with the driving links and guide links having the configuration of the present invention and showing the radius of curvature of the concave edge and guide surface of the chain tensioner;

FIG. 8 is an elevational view of a roller chain link of the present invention;

FIG. 9 is an elevational view of a silent chain link of the present invention;

FIG. 10 is an elevational view of a guide link of the present invention;

FIG. 11 is a partial side elevational view of a silent chain showing the concave backs or edges of both the silent chain links and the guide links; and, FIG. 12 is a perspective view of a roller chain of the prior art.

DETAILED DESCRIPTION OF THE DRAWINGS

Figure 12:
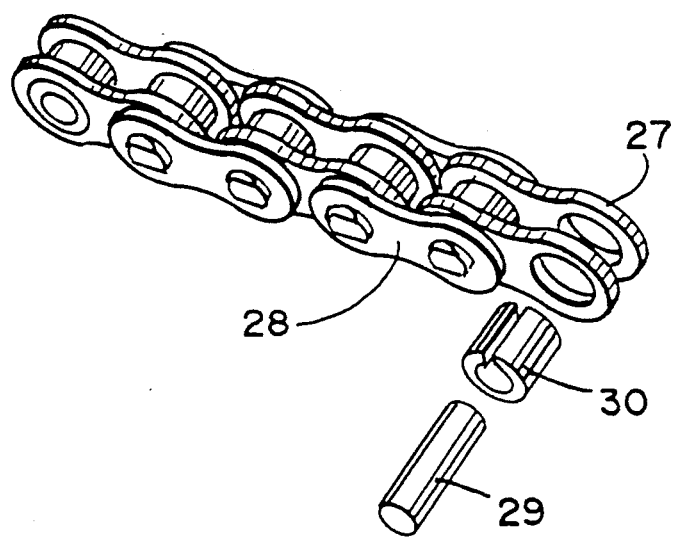

Turning now to the drawings, FIG. 1 discloses a silent timing chain assembly 10 for an automotive engine. A camshaft sprocket 11 having teeth 12 and a crankshaft sprocket 13 having teeth 14 are mounted in spaced relation on the camshaft 15 and the crankshaft 16 projecting from the front of an automobile engine (not shown). The sprockets are drivingly connected by an endless timing chain 17.

A resiliently-biased chain tensioning device 18, or chain tensioner, is positioned externally of the chain assembly between the sprockets 11 and 13 and acts to urge the chain inwardly to reduce slack in the chain. The tensioner also acts to provide a substantially constant tension on the chain as the crankshaft sprocket 13 drives the camshaft sprocket 11. The tensioner 18 has an externally radiused contact surface 19 that is conventionally formed of a suitable plastic material to reduce the friction occurring between the tensioner surface and the metallic backs of the links. The chain tensioner may be located on either the tight side or the slack side of the chain.

Conventional chain links 21, 22, 23, of the prior art are shown in FIGS. 3, 4 and 5. The convex or rounded back silent chain link 22 is shown in Figure 3. The straight back guide link 23 for silent chain is shown in FIG. 4. The guide link 23 typically is either straight or slightly convex. The straight sidebar 24 of roller chain link 21 is shown in FIG. 5.

The straight back of each of these links 21, 22, 23 contacts the rounded chain tensioner at a localized area. As shown in FIG. 2, the tensioner 18 contacts the links 21 in the localized areas 26. Such localized contacts provide high unit contact stresses.

A conventional roller chain of the prior art is shown in FIG. 12. The chain includes inner link plates 27 and outer link plates 28 and pins 29 and bushings 30. A roller (not shown) can also rotate around the bushing to contact the sprocket teeth. The curvature of the link side plate does not match the radius of curvature of the tensioner. The curvature of the link is for material reduction from the links. As shown in FIG. 8, the roller chain embodiment of the present invention includes link plate 31 with a straight side 32 and a concave back 33 extending substantially between the spaced apertures 34. The apertures are suitable for round pivot pins 35. The back side 33 is located externally of the chain so as to contact the tensioner along the concave portion. As shown in FIG. 6, the radius of curvature (Rt) of the tensioner surface is matched to the curvature of the link plate.

As shown in FIGS. 7, 9, 10, and 11, in the silent chain embodiment of the present invention, the silent chain link 41 is provided with spaced apertures 42 suitable for pivot pins 35. The link 41 includes a pair of toes or teeth 43 depending from the link and being joined at a crotch 44. The back of the link includes a concave edge 45. The guide link 51, shown in FIG. 10, may also have a concave back 52. The concave backs 45, 52 generally conform to the configuration of the chain tensioner. The chain assembly of interleaved silent driving links 41 and guide links 51 is shown in FIG. 11.

In FIG. 7, the silent chain 46 of links 41 is shown in contact with the curved surface 19 of the chain tensioner 18 such that the radius of curvature of the concave back 45 is equal to the radius of curvature Rt of the tensioner surface. This conforming geometry of the chain link and tensioner will increase the contact area between the tensioner and the link, resulting in the development of lower contact pressures. This will reduce the rate of wear of the tensioner surface and reduce the tendency for tensioner pitting and spalling. The surface curvature will blend from link to link in the chain as the chain bends around the tensioner. The conforming curvatures need not be exactly the same for the chain links and the tensioner surface. However, the link radius is preferably equal to or greater than the tensioner radius of curvature.

The tensioner may be located to push the chain either inward or outward. The tensioner may also be in the form of a roller on a pivotally mounted tensioner arm.

While several embodiments for the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A roller chain assembly for use with a sprocket and a chain tensioner, said tensioner having a tensioner surface defined by a radius of curvature, said chain having a series of interleaved inner links and outer links;
   each outer link having a pair of outer link plates fixedly mounted to spaced pin members, said outer link plates having a front portion and a back portion;
   each inner link having a pair of bushings mounted to turn on said pins of said outer links, said inner links having inner link plates fixedly mounted to said bushings, said inner link plates having a front portion and a back portion;
   each of said inner links and said outer links being adapted to receive a sprocket tooth;
   at least some of said outer link plates having a concave back portion, said concave back portion having a radius of curvature that substantially matches the curvature of said tensioner surface.

2. The chain assembly of claim 1 wherein said back portions are defined as being external to the interleaved chain assembly.

3. The chain assembly of claim 2 wherein at least some of said inner link plates have a concave back portion.

4. The chain assembly of claim 2 in combination with a chain tensioner, said tensioner having a tensioner contacting surface, said tensioner contacting surface having a radius of curvature less than the radius of curvature defining said outer link plate concave back portion.

5. The chain assembly of claim 3 in combination with a chain tensioner, said tensioner having a tensioner contacting surface, said tensioner contacting surface having a radius of curvature less than the radius of curvature defining said inner link plate concave back portion.

6. A power transmission chain for use with a sprocket and a chain tensioner, said tensioner having a tensioner surface defined by a radius of curvature, said chain comprised of a plurality of interleaved sets of links, pivot means connecting adjacent sets of links, each link defining a pair of apertures for receiving said pivot means,
   some of the links of said chain having an upper portion and a lower portion, each lower portion having at least one toe, said toe being adapted to contact said sprocket,
   said upper portions of at least some of said links having a concave edge, said concave edge having a radius of curvature that substantially matches the curvature of said tensioner surface.

7. The chain assembly of claim 6 including guide links, at least some of said guide links having a concave back portion.

8. The chain assembly of claim 6 in combination with a plurality of sprockets and a chain tensioner, said tensioner contacting surface having a radius of curvature substantially equal to the radius of curvature defining said concave edge.

9. The chain assembly of claim 6 in combination with a plurality of sprockets and a chain tensioner, said tensioner contacting surface having a radius of curvature less than the radius of curvature defining said concave edge.

10. The chain assembly of claim 7 in combination with a plurality of sprockets and a chain tensioner, said tensioner contacting surface having a radius of curvature less than the radius of curvature defining said guide link back portion.

11. The chain assembly of claim 7 in combination with a plurality of sprockets and a chain tensioner, said tensioner contacting surface having a radius of curvature substantially equal to the radius of curvature defining said guide link back portion.

12. A chain assembly and sprocket combination, comprising an assembly of interleaved chain links and a plurality of toothed sprockets,
   a chain tensioning device, said chain tensioning device having a contacting surface with a predetermined radius of curvature, said tensioning device being located externally of the interleaved assembly of links,
   said chain links being formed with a back surface having a concave curvature that substantially matches the curvature of said tensioner surface.

* * * * *

UNITED STATES PATENT AND TRADEMARK OFFICE
CERTIFICATE OF CORRECTION

PATENT NO. : 5,176,585
DATED : January 5, 1993
INVENTOR(S) : Gary J. Novak

It is certified that error appears in the above-indentified patent and that said Letters Patent is hereby corrected as shown below:

On The Title Page

In column 2, under "References Cited U.S. PATENT DOCUMENTS" please add the following:

```
-- 4,186,617    2/5/80      Avramidis
   4,227,422    10/14/80    Kawashima et al.
   4,342,560    8/3/82      Ledvina et al.
   4,509,323    4/9/85      Ledvina et al.
   4,509,937    4/9/85      Ledvina et al.
   4,758,210    7/19/88     Ledvina --
```

Signed and Sealed this

Twenty-seventh Day of February, 1996

Attest:

BRUCE LEHMAN

*Attesting Officer*   *Commissioner of Patents and Trademarks*